United States Patent [19]

Boyles et al.

[11] 4,036,941

[45] July 19, 1977

[54] PREPARATION OF FERRIC SULFATE SOLUTIONS

[75] Inventors: Bruce K. Boyles, Saxonburg, Pa.; John L. Crow, Jr., Savannah, Ga.

[73] Assignee: American Cyanamid Company, Stamford, Conn.

[21] Appl. No.: 675,094

[22] Filed: Apr. 8, 1976

[51] Int. Cl.$^2$ ............................................. C01G 41/14
[52] U.S. Cl. ................................... 423/558; 423/150
[58] Field of Search ............... 423/558, 150, 140, 146, 423/DIG. 2, 555

[56] References Cited

U.S. PATENT DOCUMENTS

| | | | |
|---|---|---|---|
| 1,644,250 | 10/1927 | Hart | 423/558 |
| 3,953,306 | 4/1976 | Lancy | 423/140 |
| 3,954,953 | 5/1976 | Satterwhite et al. | 423/558 |

Primary Examiner—O. R. Vertiz
Assistant Examiner—Brian E. Hearn
Attorney, Agent, or Firm—William J. van Loo

[57] ABSTRACT

A process for recovery of iron from an iron mud containing a mixture of gypsum and ferric hydroxide, which comprises contacting said gypsum and ferric hydroxide mixture with sulfuric acid of a concentration between 93 and 98% for a period of 1 to 12 hours, removing the undissolved material and recovering the iron as a 25 to 50% ferric sulfate solution.

2 Claims, No Drawings

PREPARATION OF FERRIC SULFATE SOLUTIONS

This invention relates to a method for neutralizing iron containing sulfuric acid waste liquors in which the waste liquor is treated with a basic calcium salt, and at the same time aerated, thereby precipitating the sulfate ion or gypsum ($CaSO_4 \cdot 2H_2O$), and iron as ferric hydroxide. Specifically, it relates to a method of recovering iron in a usable form, from a precipitate (iron mud) containing both gypsum and ferric hydroxide.

Sulfuric acid waste liquors are generated in such process as the pickling of steel, and in the production of titanium dioxide from ferrotitaniferous ores. Such waste liquors cannot be discharged into the environment without expensive treatment, and one advantage of the present invention is that it allows the iron contained in such waste liquor to be recovered as a commercially useful product, and thereby helps to defray the cost of treating the waste liquor.

It is well known that if a waste liquor containing sulfuric acid and ferrous or ferric iron salts is treated with a basic calcium salt, and at the same time aerated, both gypsum and ferric hydroxide will be precipitated. It is also known that if the amount of calcium added to such a liquor is limited, then gypsum can be precipitated without precipitating iron salts (U.S. Pat. No. 3,375,066). This process gives pure gypsum and an iron soultion which contains sulfuric acid. The iron solution is thus an iron containing sulfuric acid waste liquor which requires further processing in order to recover the iron in useable form.

If a sulfuric acid waste liquor containing only ferrous iron is treated with a limited quantity of a basic calcium salt, gypsum is precipitated which contains only a small amount of ferrous salts. Those ferrous salts which do remain on the gypsum can be removed by washing several times with dilute sulfuric acid (U.S. Pat. No. 2,197,003). Of course, the iron leached from the gypsum by this process is in dilute solution, and is not recoverable without further processing.

A primary object of the present invention is to recover, in a useable form, such as a concentrated aqueous solution of ferric sulfate, iron which might otherwise be discarded when sulfuric acid waste liquor is neutralized. Additional objects and advantages of the invention will become apparent from the claims and from the description of the invention which are set forth hereinbelow.

In accordance with the present invention, after an iron containing sulfuric acid waste liquor has been treated with a basic calcium salt, aerated, and the resulting precipitate of gypsum and ferric hydroxide (iron mud) isolated, said iron mud is treated with 93 to 98% sulfuric acid for a period of from 1 to 12 hours. The sulfuric acid is used in a stoichiometric amount for the ferric hydroxide present in the mud, or possibly in very slight excess. This treatment converts between 80 and 100% of the ferric hydroxide contained in the original iron mud to ferric sulfate. The reaction mixture is cooled to a temperature between 25° and 60° C. and the undissolved material is removed. The remaining solution is found to contain between 25 to 50% ferric sulfate and a little residual acid. The ferric sulfate solution is useable in water treatment in admixture with organic flocculants.

EXAMPLE 1

A 250 g (dry weight 156.6 g) composite sample of gypsum and ferric hydroxide (iron mud) containing 10.4% Fe, dry basis, was mixed with a stoichiometric amount of 96% $H_2SO_4$ (44.7 grams) and agitated for 1 hour. The resulting slurry was cooled to 60° C. and filtered with a Buchner funnel. The resulting filtrate contained 31.9% $Fe_2(SO_4)_3$. The cake contained 1.8% Fe. The recovery of Fe from the original iron muds was 83%.

EXAMPLE 2

A 250 g (dry weight 170.5 g) composite sample of iron mud containing 10.45% Fe, dry basis, was mixed a stoichiometric amount of 96% $H_2SO_4$ (48.9 grams). The slurry was agitated 1 hour and allowed to stand overnight, whereupon the temperature dropped to 25° C. The slurry was filtered with a Buchner funnel. The resulting filtrate contained 41.1% $Fe_2(SO_4)_3$. The cake contained 0.69% Fe. This represents a iron recovery of 93.4%.

What is claimed:

1. A process for recovery of iron from an iron mud containing a mixture of gypsum and ferric hydroxide, which comprises contacting said gypsum and ferric hydroxide mixture with a stoichiometric equivalent based on the ferric hydroxide content of sulfuric acid of a concentration between 93 and 98% for a period of 1 to 12 hours, cooling the reaction mixture to a temperature between 25° and 60° C, removing the undissolved material and recovering the iron as a 25 to 50% ferric sulfate solution.

2. The process of claim 1 wherin the iron mud is produced by neutralization, in the presence of air, of an iron containing sulfuric acid waste liquor with a basic calcium salt.